Nov. 25, 1958 W. L. KEEHN 2,861,845
FLUID PRESSURE BRAKE SYSTEM
Filed July 5, 1955 4 Sheets-Sheet 1

INVENTOR.
WARNER L. KEEHN
BY
Boyken, Mohler & Wood
ATTORNEYS

Nov. 25, 1958

W. L. KEEHN 2,861,845

FLUID PRESSURE BRAKE SYSTEM

Filed July 5, 1955

INVENTOR.
WARNER L. KEEHN
BY
*Boyken, Mohler & Wood*
ATTORNEYS

Nov. 25, 1958        W. L. KEEHN        2,861,845

FLUID PRESSURE BRAKE SYSTEM

Filed July 5, 1955        4 Sheets-Sheet 4

INVENTOR.
WARNER L. KEEHN
BY
Boyken, Mohler & Wood
ATTORNEYS

United States Patent Office 2,861,845
Patented Nov. 25, 1958

2,861,845

FLUID PRESSURE BRAKE SYSTEM

Warner L. Keehn, Santa Rosa, Calif., assignor to Keehn-O Manufacturing Company, a corporation of Nevada Application July 5, 1955, Serial No. 519,852

4 Claims. (Cl. 303—89)

This invention relates to fluid actuated brake system and to components thereof, and in more particular to an air brake system for use on trucks, and trucks and trailers.

In the following explanation, reference will be made to "air" rather than the more inclusive word "fluid" inasmuch as the invention as illustrated in the drawings is particularly suitable to air or gas brake equipment and is shown in an air brake system.

Also, when the word "trailer" is used, reference is had to either a full-trailer of a semi-trailer; and the word "truck" is used to encompass a tractor. By the use of the word "manual" is meant the direct primary action of a person by bodily movement, either by hand, foot, or otherwise, as distinguished from a consequent result.

Accidents frequently occur, and are always imminent, where vehicles, such as trucks, are parked and held solely by the force of the air held in the air tanks of the air braking system. This danger is present because of the many points at which air leakage may occur or rupture of the system may take place, such as at the many connections, the valves, and the long conduit leads. Many states recognize the likelihood of such accidents by compelling some safety measure in the event of failure of the main air supply and the available air pressure is too low to be effective in holding the vehicle or in stopping it if it should start to move.

In some instances where trucks are parked on level places for a number of hours without replenishment of the source of compressed air, there is virtually no air pressure and the brakes will be inoperative until the air pressure has been built up to the point where it will actuate the brakes. If such trucks are moved after their engines have been started but before adequate air pressure exists in the tanks, they cannot be stopped.

By the present invention this is virtually impossible for the reason that adequate air pressure to actuate the brakes must exist before the brakes can be released, and the brakes will remain applied with the same force that was used to stop and to hold the truck until sufficient air pressure is available to stop and to hold the truck.

Another desirable feature of the present invention is that a particular braking effect may be applied to a trailer and held constant without further manual control while the braking effect on the truck may be varied at any value less than that on the trailer. This is desirable on long hills and for quick stops as it reduces the tendency of the trailer to jackknife on the truck by causing the trailer to hold back on the truck. Jack-knifing occurs when the truck holds the trailer.

There have been devised various such systems but they have lacked the needed safety features of non-failure of the entire system in the event of rupture of certain parts prone to failure; the easy establishment and control of a differential braking effect between truck and trailer; a fluid actuated brake lock; and a simple and effective alternate source of fluid pressure for emergency use in the event of loss of the primary source of fluid pressure.

Having in mind these defects of the prior brake systems, it is an object of the present invention to devise a direct air brake system having a brake lock valve in which system the brakes may be set by air supplied from a manual control through a brake line to the lock valve; which set will remain upon exhaust of such line; and the release of which set is obtained by a subsequent manually controlled direct application of air to said valve.

A further object of the invention is the provision of an auxiliary source of liquified gas under pressure for use in the present systems that will enable an operator to apply and set the brakes in an emergency in the event the air tanks are exhausted.

A further object of the present invention is the devising of a braking system and an air operated lock valve so that the valve may be located close to the brake cylinders, or diaphragms, so that the chance of air leakage is reduced when the brakes are set and locked.

A still further object of the invention is the devising of a direct air brake system for use on truck-trailer assemblies in which a greater braking effect may be applied to the trailer than to the truck and the truck braking effect may be varied so long as it is less than the trailer effect. Yet, the trailer effect may be increased or decreased from an effect first obtained.

Another object of the invention is the devising of a sensing shut-off valve which will sense and shut-off the flow of air to a line which has ben ruptured or broken while other lines being sensed are not broken or ruptured.

The foregoing defects of the prior art are remedied and these objects achieved by a truck-trailer fluid pressure brake system in which there is provided a conventional air supply, foot operative air valve, and brake diaphragms operating mechanical friction brakes. The heart of the present invention which makes possible a new system is found in a new brake lock valve which is constructed with two air inlet ports, a pilot valve, and check valves which will prevent the return of air from the brake diaphragms. The position of the pilot valve is determined by the port used for the entry of air and the position of the pilot valve determines whether the check valves are effective or ineffective to prevent the return of air from the diaphragms.

This brake lock valves includes in its outlet portion a balanced valve which is biased to an open position with respect to two outlets so that if a rupture occurs which reduces the pressure in one outlet with respect to the other, the balanced valve will move to close such one outlet. The foot operative air valve controls air to the inlet port which renders the check valves ineffective. A second air valve, or cab control valve, delivers air to the inlet port which renders the check valves effective. Thus, once the brakes have been set by the cab valve they cannot be released until the foot valve has been operated to deliver air at a pressure greater than that used to set the brakes.

A further feature is that of connecting to the cab valve a bottle of liquid carbon dioxide for use as an emergency source of gas under pressure for actuation of the brakes. Thus when the brakes are set by the use of this emergency source, they cannot be released until adequate air is supplied from the conventional source through the foot valve.

The novel features of the invention that have been outlined above are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 3 shows the pilot valve in position to allow the check valves to be effective.

Fig. 4 shows the pilot valve in position to render the check valves ineffective.

Fig. 5 shows the check valves in closed position.

Fig. 6 shows the balanced valve closing one of the outlet openings.

Figs. 8 and 9 are sectional views on the line 8—8 of Fig. 7.

A clear understanding of the functioning of the various parts of the schematic showing of Fig. 1 cannot be had without reference to the details of construction of the valves shown in Figs. 3 to 9 inclusive, but as it is desirable to have in mind the various parts of the system to aid in the understanding of the functioning of these valves, a short tabulation of the parts of this system will first be given.

Figure 1:
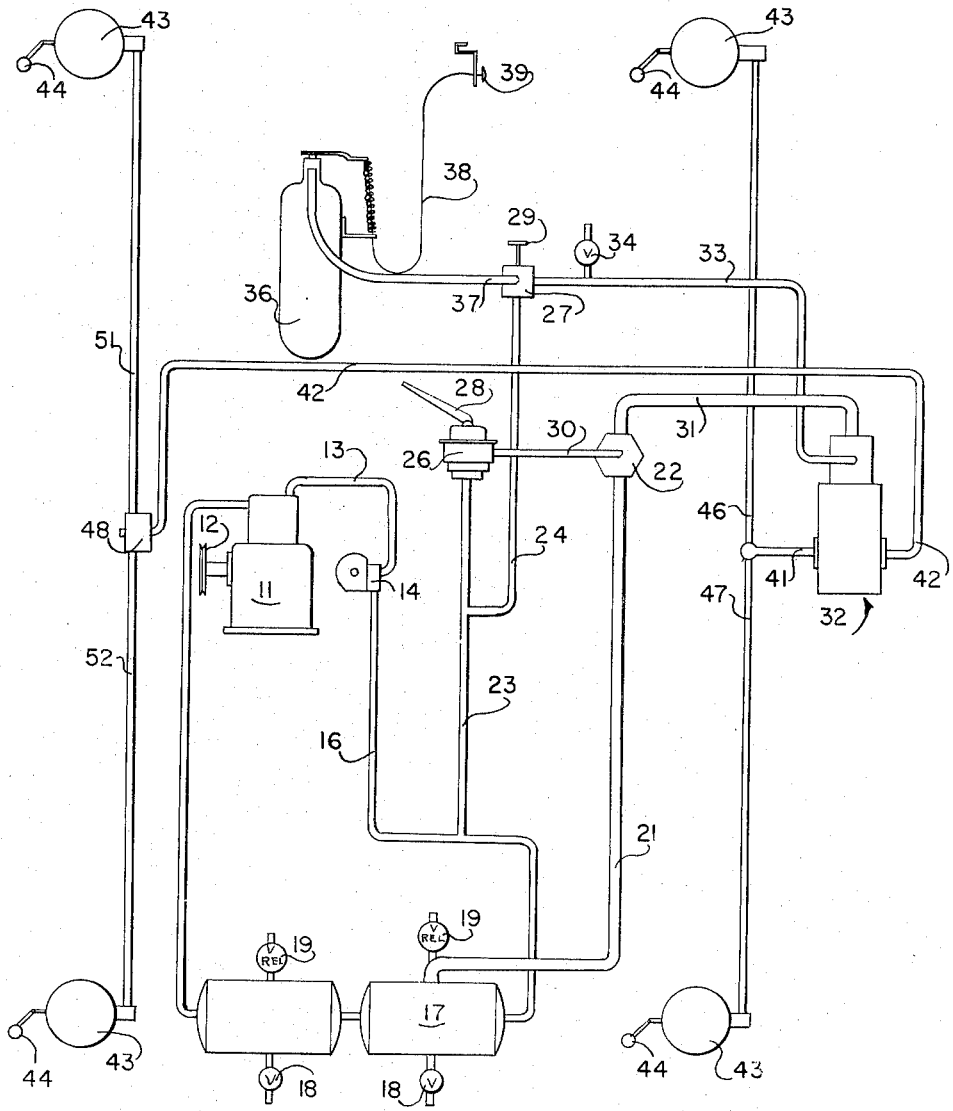
Fig. 1 is a diagrammatic showing of a single axle form of a fluid pressure brake system embodying various features of the invention.
Figure 2:
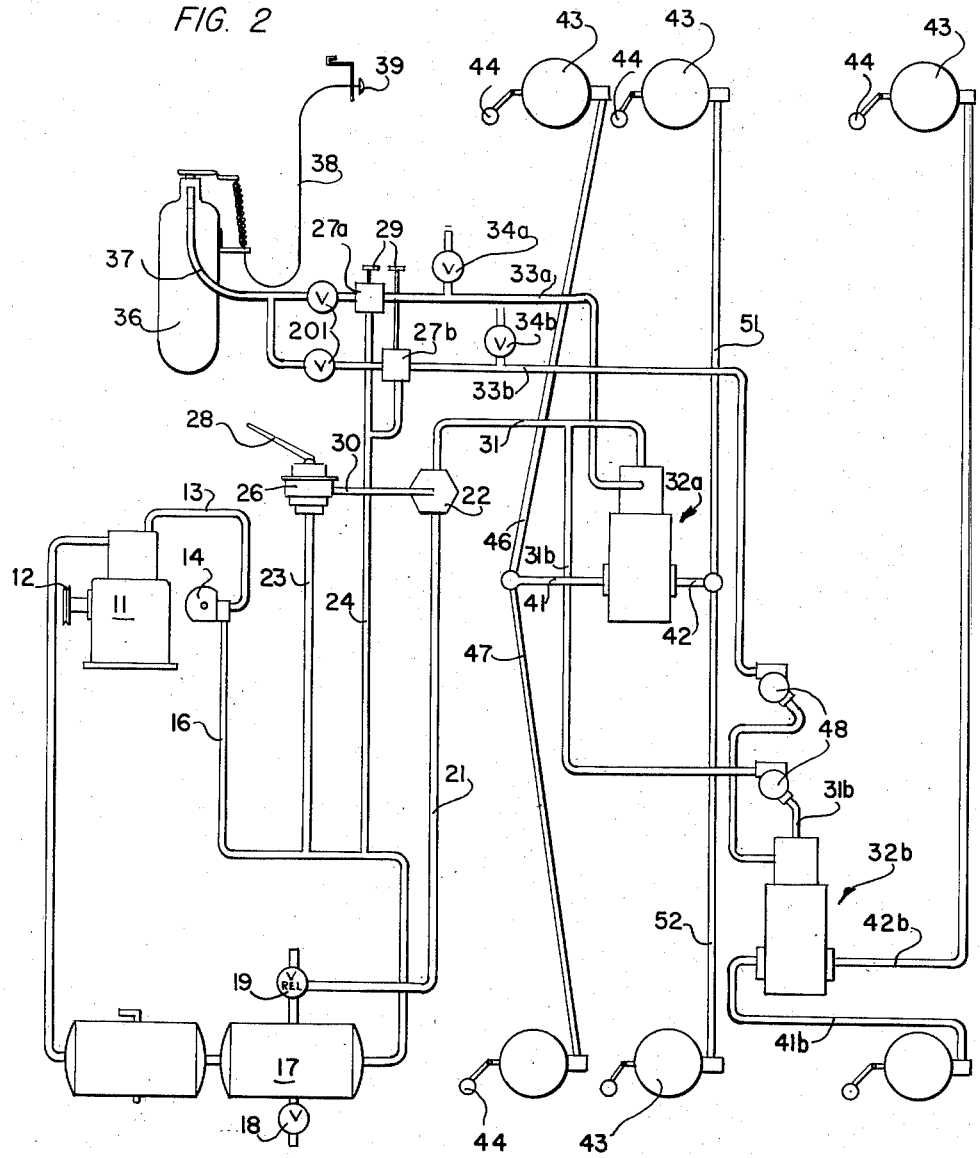
Fig. 2 is a diagrammatic showing of a dual axle and trailer form of a fluid pressure brake system embodying other features of the invention in addition to those found in Fig. 1.

Referring to Figs. 1 and 2, when such a sysem is used on a truck, air is supplied from a compressor 11, a fluid motive source, driven by the truck motor through any suitable gearing or belts to the compressor drive wheel 12. The air output of the compressor passes through a conduit 13 to a governor 14 and then through a conduit 16 to a storage tank 17. The storage tank is equipped with a drain cock 18 and a safety relief valve 19. Air from the tank passes to the rest of the system through conduit 21 leading to a relay valve 22 and through conduits 23, 24 to control valves 26, 27. The foot control valve 26, hereinafter often referred to as the first control valve, is usually secured to the floor of the cab with the operating lever 28 accessible to the foot of a driver. The second control valve 27 has a hand engaging disc 29 for its operation. A first control conduit 30 connects the foot valve 26 with the relay valve 22, and this first control extends by means of a conduit 31 from the relay valve to a brake lock valve 32. The function of the relay valve 22 is that of reducing the amount of air required to pass through the foot control valve 26. It is simply a valve operated by the foot control valve. Also, it serves to exhaust the conduit 31 when fluid pressure from the foot valve 26 has been relieved.

Control valve 27, hereinafter often referred to as the second control valve or the cab control valve, also delivers air to the brake lock valve 32, and it does this through a second control conduit 33 between the second control valve and the brake lock valve. This conduit may be vented by a valve 34, the need of which will be set forth hereinafter.

An auxiliary fluid motive source for emergency operation of the system is provided by the bottle 36 of liquid carbon dioxide which has a conduit connection 37 to the second control valve 27, and a release cable 38 with an operating handle 39 situated in the truck cab. Movement of the handle 39 will release gas from the bottle into the system through the second control valve 27 in a manner to be hereinafter described in detail.

Air from the brake lock valve 32 is delivered through the outlet conduits 41, 42 to the various expansible chambers 43 which operate the mechanical friction brakes, here shown only by the brake operating arms 44. The outlet 41 divides into the lines 46, 47 with line 46 going to the chamber of a right rear truck wheel brake and the line 47 going to a left rear truck wheel brake. The outlet conduit 42 goes to a quick release valve 48 and thereafter divides into the conduits 51, 52 which each connect to the expansible chamber of a brake mechanism on the front wheels of the truck.

Figure 3:
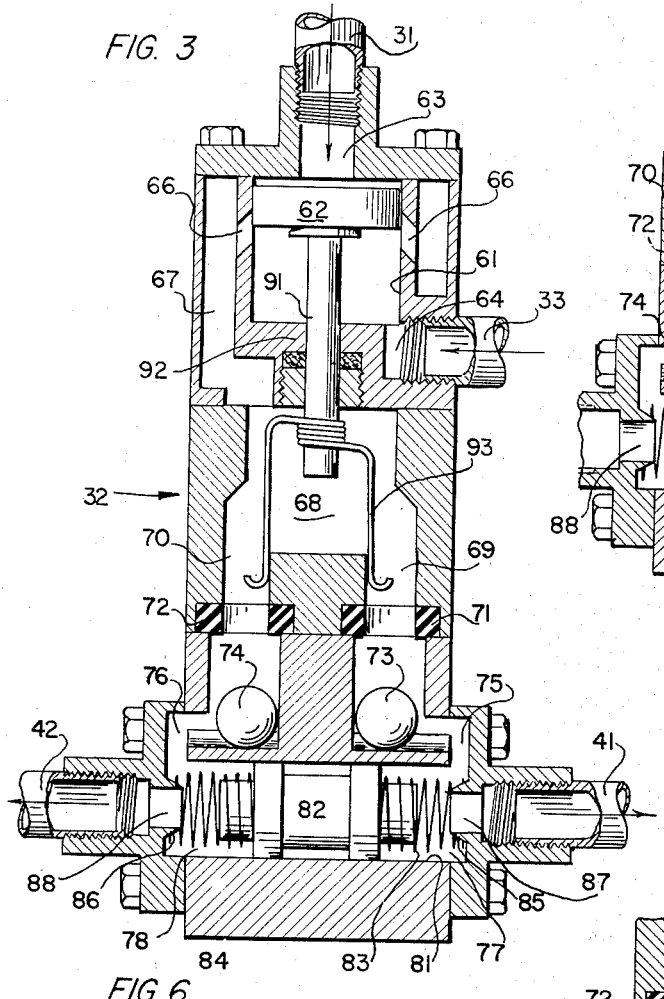
Fig. 3 is a full.

The brake lock valve 32, shown in detail in vertical section in Fig. 3, is formed interiorly with a pilot valve cylinder 61 having therein a pilot valve 62 adapted for reciprocal movement therein, up and down as seen in Fig. 3. The downward movement is caused when air enters the upper end of the cylinder through a first inlet port 63 from the first control conduit 31. The upward movement is caused when air enters the lower end of the cylinder through a second inlet port 64 from the second control conduit 33. As shown, the pilot is in the upper position where it closes the first inlet port 63. In the lower position the pilot will close the second inlet port 64.

Air leaves the cylinder, when the pilot is in either position, through the cylinder outlet ports 66 and passes downwardly through a passage 67 to the check valve chamber 68 where it divides into the check valve inlet ports 69, 70, then passes the check valve seats 71, 72, the check balls 73, 74 and through the outlet ports 75, 76. Each check valve outlet port 75, 76 leads to an opposite end 77, 78 of a balanced valve cylinder 81 in which there is placed for reciprocal movement, transversely of valve 32, a balanced valve 82 which is biased medially of its cylinder by the biasing springs 83, 84. At each end of the balanced valve cylinder 81 is a valve seat 85, 86. Each seat affords communication with an outlet opening 87, 88. The outlet opening 87 is connected with the outlet pipe 41, and the opening 88 is connected with the outlet pipe 42.

The pilot valve 62 is formed with a stem 91 guided in the lower end 92 of the pilot valve cylinder 61 to extend into the check valve chamber 68 where the stem is provided with a bifurcated spring 93. Each prong of the spring extends into one of the check valve inlet ports 69, 70. The spring may be tensioned to ride on the walls of the ports so as to damp the movements of the pilot valve 62. The spring extends into the ports a distance such that when the pilot is in its upper position the spring ends will not interfere with the check balls 73, 74 engaging their seats 71, 72, and when the pilot is in its lower position the spring ends will prevent the check balls from seating and render them ineffective in preventing upward flow of air through the lock valve 32. When the checks are effective they require unidirectional, downward flow of air through the lock valve. Fig. 3 shows the spring 93 in position to allow the check balls to operate effectively.

Figure 4:
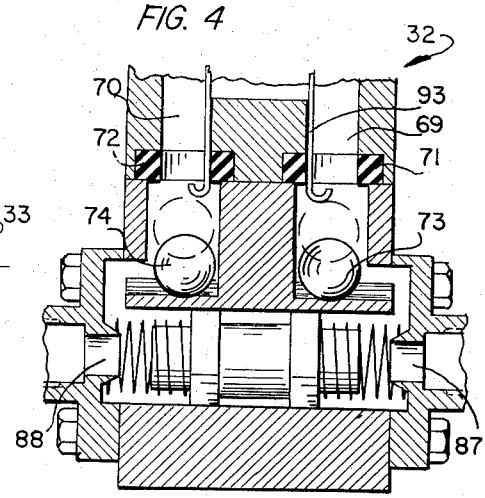
Figs. 4, 5 and 6 are partial sectional views, all in the same diametrical plane, of a novel lock valve used in the systems shown in Figs. 1 and 2.

Fig. 4 shows the prongs of the spring 93 in position to render the check balls 73, 74 ineffective. In the position of parts as shown in Fig. 4, the pilot valve is in its lower position.

Figure 5:
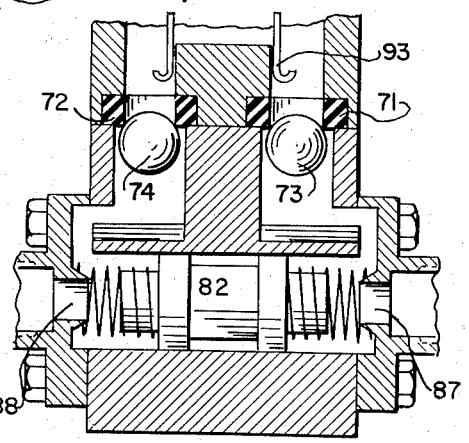

Fig. 5 shows the check balls 73, 74 in engagement with their seats 71, 72. Under this condition the spring 93 and the pilot valve 62 would be in their upper position as shown in Fig. 3.

Figure 6:
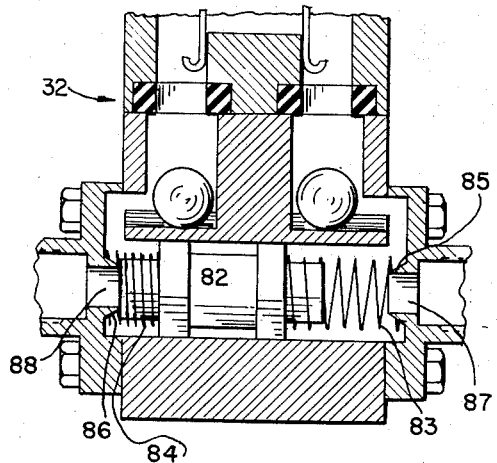

Fig. 6 shows the balanced valve 82 in engagement with its left hand valve seat 86 to close the outlet passage 88. The balanced valve 82 will move from its biased medial position whenever there is a pressure differential between its ends. This occurs when there is a rupture in one of the lock valve outlets, as in the outlet conduits 41, 42, 43, 44, 51, 52, the valve 48, or one of the expansion chambers 43. Thus a rupture of one of these conduits or chambers will not cause loss of air to all of the brake expansion chambers.

Figure 7:
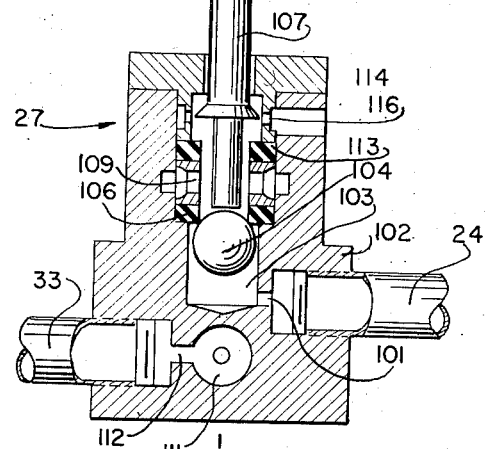
Figs. 7, 8 and 9 are full sectional views of a novel cab control valve used in the systems shown in Figs. 1 and 2, and show the parts thereof in various operated positions.
Figure 8:
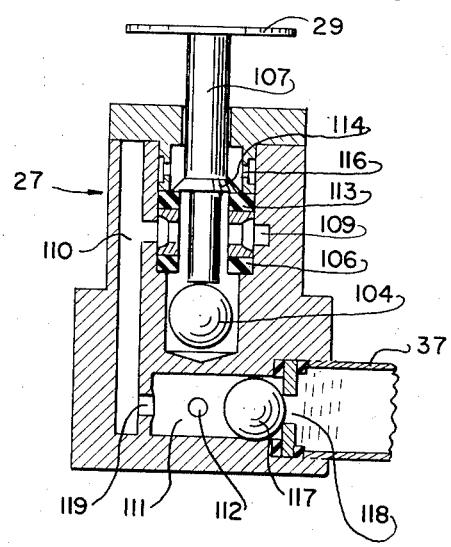
Figure 9:
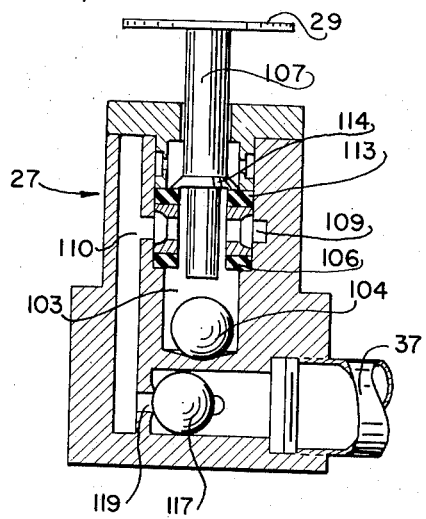

The vertical sectional views of Figs. 7, 8 and 9 show various features of the cab control valve 27, the second control valve. In Fig. 7, air from the fluid motive source, either the compressor 11 or the tank 17, or both in combination, passes through the supply conduit 24 to the cab control valve through its inlet air port 101, formed in the body 102 of the valve, and into a valve chamber 103 which contains a ball valve 104. The ball valve is shown in Fig. 7 seated on its seat 106, in which position it blocks the flow of air through the valve 27. Fig. 8 shows the ball valve 104 moved off its seat by a manually operable plunger 107 which has at its upper end the hand engaging disc 29. Air may then flow to an outlet chamber 109 above the seat, through a passage 110 (Figs. 8 and 9) down to a shuttle valve chamber 111, through an outlet port 112 and into the second control conduit 33 (Fig. 7).

When the plunger 107 is in its position (Fig. 7), return air from the second control conduit 33 may enter the shuttle chamber 111, the passage 110, the outlet chamber 109, then upward around the plunger 107 and through a vent valve seat 113, past a vent closure 114 in the form of an annulus secured to the plunger, and then to the atmosphere through a vent opening 116 formed in the valve body 102. When the plunger is in its lower position, Fig. 8, the vent closure 114 and its seat 113 close off this vent opening 116 so that air entering the valve from the conduit 24 is not vented but forced to pass through the valve to the second control conduit 33.

In the shuttle valve chamber 111 there is placed a ball shaped shuttle valve 117 that is free to move from one end to the other of its chamber. As seen in Fig. 8, the shuttle is blocking a port 118 leading to the conduit 37 which is adapted to supply an emergency fluid. The shuttle is held against this port by the air pressure in the valve. Fig. 9 shows the shuttle 117 held against the port 119 leading to the passage 110 to prevent the escape of emergency fluid through the valve vent 116 or into conduit 24 from the conduit 37. Thus all fluid entering the shuttle chamber 111 is forced out the outlet port 112 into the second control conduit 33.

In Fig. 9, the ball valve 104 is shown off its seat on the supposition that there is no supply of air from the conduit 24. Thus if fluid from the emergency supply 37 were to enter the valve chamber 103, it would lift the vent closure 114 off its seat and pass to the atmosphere. The shuttle 117 prevents this.

The operation of the system of Fig. 1 when used on a truck is as follows. Air is supplied to the system from the compressor 11 or the tank 17 to charge the supply lines 16, 23, 24 to the first and second control valves 26, 27 and to charge the supply line 21 to the relay valve 22. When the foot of the driver depresses the operating lever 28 of the first control valve 26, air passes through the relay control line 30 to actuate the relay valve 22 to release air in the supply line 21 into the first control conduit 31. Air from this first control conduit enters the brake lock valve 32 to drive the pilot 62 and spring fork 93 downward to render the check valves 73, 74 ineffective and to deliver air to the various expansible brake chambers 43 to operate and set the brakes. When the first control valve operating lever 28 is raised, the supply of air to the brakes is stopped and the conduits and brake lock valve are vented through a relief port in the relay valve 22 and the control valve 26. The check valves 73, 74 in the brake lock valve are prevented from seating by the ends of the spring fork 93 as the vented air passes the checks.

When it is desired to lock the brakes, the driver presses on the hand disc 29 of the second control valve 27 to depress the plunger 107 which closes the vent 116, and moves the ball valve 104 to allow air to enter the valve from the supply conduit 24, and to pass through the valve into the second control conduit 33. Air from the conduit 33 then enters the brake lock valve 32 to force the pilot 62 upward whereby the check valves 73, 74 may be effective when the air has set the brakes 44 to prevent the return of such air through the valve. The brakes are thus given and held at a desired set, or are locked. Release of the brakes may be had by operation of the first control valve 26 to deliver air through the lock valve inlet port 63 at a pressure sufficient to force the pilot downward so that the ends of the spring fork 93 will force the check valves 73, 74 off their seats.

Thus it will be seen that when once the brakes have been set by the second control valve 27, they may be readily released by actuation of the first valve 26. Once the brakes are set, their holding is not dependent on an air supply such as the tank 17. If there should occur a rupture in the lines associated with either conduit 41 or 42 and a loss of air from either such line, then the shuttle 82 will operate to close off air to either conduit 41 or 42 which has lost air, to leave the brakes associated with the other conduit in operative condition. This result is reached whether the brakes are locked by valve 27 or normally applied.

The bottle 36 of liquid carbon dioxide furnishes an auxiliary emergency fluid motive source for operation of the system in case of failure or absence of an air supply. When it is desired to use the carbon dioxide, the handle 39 is operated to release gas from the bottle. This gas flows through the gas line 37 from the bottle to the second control valve 27 where it enters through the port 118 at one end of the shuttle chamber 111 to force the shuttle valve 117 to close the port 119 leading to the valve chamber 109 and the exhaust port 116. The carbon dioxide leaves the shuttle chamber through the outlet 112 and into the control conduit 33 from which it enters the brake lock valve 32 to operate it and the brakes in the same manner as would air from the conduit 33. As the vent 116 in the second valve 27 is blocked by the shuttle 117, and as the pressure of the carbon dioxide may be greater than that which the air supply is capable of, the vent cock 34 is provided in the control conduit 33 so that the pressure on the underside of the pilot valve 62 may be relieved. This allows air pressure on the topside of the pilot to force the check valves 73, 74 open. The area of the pilot is sufficiently greater than that of the check valve seat openings so that the air pressure on the pilot will open the checks even if the unit fluid pressure seating the checks is greater than the unit air pressure on the pilot.

The schematic modification shown in Fig. 2 has many of the same components as shown in Fig. 1 and these same components have been given the same reference numerals. The purpose of this modification is to show one of the ways in which a plurality of the disclosed brake lock valves 32 may be used in a dual axle truck brake system or in a truck-trailer system, and to indicate other such modifications.

The modification of Fig. 2 has been made for use on a truck-trailer unit with a brake lock valve 32A on the truck and another one 32B placed on the trailer. Both of these valves are supplied with air from the foot controlled valve 26 and relay valve 22 through the first control conduit 31 which is branched by a conduit 31B having therein a "glad-hand" or breakaway valve connection 48 located between the truck and its trailer. This branch conduit 31B connects to the top of the trailer lock valve 32B to deliver air to the upper side of its pilot 62.

Air to lock the brakes may be delivered to the brake lock valves 32A, 32B through separate cab valves 27A, 27B and separate control conduits 33A, 33B. A "glad-hand" connection 48 is also located in the trailer second control conduit 33B. The same air supply conduit 24 supplies air to both cab valves 27A, 27B. The carbon dioxide bottle 36 has its line 37 to the cab valves branched and a shut-off valve 201 placed in each branch so that in the use of this auxiliary source of pressure fluid it may be applied selectively to either cab valve.

The outlet conduit 41 from the lock valve 32A is branched at 46, 47 to truck brakes located on opposite sides of the truck on one axle, and the outlet conduit 42, by its branches 51, 52 is connected to the brakes on the other truck axle. These branched conduits and the brakes 44 connected thereto are suitable for a dual axle braking system.

The outlet conduits 41B, 42B from the trailer lock valve 32B are not branched in order to illustrate the fact that these brake lock valves may be used to close the line to a single brake chamber if there is failure in the chamber or the line thereto. Alternatively, in a trailer having two axles, line 41B, 42B, may be branched to each supply the brakes on one axle, as shown for the truck.

In the operation of the modification shown in Fig. 2 there are features that differ from the operation found in the modification of Fig. 1. In Fig. 2, all the brakes may be set or released simultaneously by the foot controlled valve 26. Also, all of the brakes could be simultaneously locked if only one cab valve 27 were to be used to deliver air to both lock valves at the same time. However, it is believed that there is considerable merit in the use of a separate cab valve for each lock valve, as shown in Fig. 2. This control allows the trailer brakes to be set by the trailer lock valve 32B at a given amount when the truck-trailer is going down hill so that the trailer will hold back on the truck to reduce the chance of jack knifing. Then air may be applied to the truck brakes by the foot valve 26 and the truck lock valve 32A, and such application will not affect the set of the trailer lock valve so long as the air pressure supplied by the foot valve is less than that required to affect release of the check valves 73, 74 in the trailer lock valve 32B.

Further, the use of a third and separate control conduit 33B in addition to the second control conduit 33A means that the trailer brakes may be set separately from the truck brakes so that the trailer may be parked and disconnected from the truck with the trailer brakes left in locked condition.

The line 37 from the emergency carbon dioxide bottle 36 is branched and valved 201 for the same reasons given above for providing the second and third control conduits 33A, 33B and the two cab valves 27A, 27B for control of the locking action of the two brake lock valves 32A, 32B.

Although the invention has been described and illustrated in detail, it is obvious that modifications could be made therein without departing from the spirit and scope of the invention.

I claim:

1. A brake system comprising, in combination: a source of air under pressure, brake means including a brake and a brake mechanism connected therewith actuatable by air under pressure for setting said brake and automatically releasable upon release of the air pressure in such mechanism, conduit means connecting said source with said brake mechanism for supplying air under pressure to said brake mechanism for so actuating the latter, valve means in said conduit means actuatable by air under pressure in said conduit means for movement to an open position passing air in the latter under pressure to said brake mechanism for actuating the latter to set said brake and also actuatable by air under pressure from said source for movement to a closed position for closing said conduit means to flow of air past said valve means to said mechanism, a valve mechanism in said conduit means actuatable by the brake setting air in said mechanism for movement to a position closing the portion of said conduit means that is connected with said mechanism, when said valve means is in said closed position, against release of the brake setting air in said brake setting mechanism whereby the brake will remain set independently of the air in said conduit, means that is disposed between said valve means and said source, and means actuatable for movement by air in said conduit means under pressure from said source for moving said valve mechanism from its position closing said portion to an open position releasing said brake setting air for movement therepast, an air conduit communicating with air from said source and with said valve means for conducting air under pressure to said valve means moving said valve means to its said closed position, control means respectively in said conduit means and in said air conduit actuatable for controlling the flow of air from said source to said valve means.

2. A brake system comprising, in combination: a source of air under pressure, brake means including a brake and a brake mechanism connected therewith actuatable by air under pressure for setting said brake and automatically releasable upon release of the air pressure in such mechanism, conduit means connecting said source with said brake mechanism for supplying air under pressure to said brake mechanism for so actuating the latter, valve means in said conduit means actuatable by air under pressure in said conduit means for movement to an open position passing air in the latter under pressure to said brake mechanism for actuating the latter to set said brake and also actuatable by air under pressure from said source for movement to a closed position for closing said conduit means to flow of air past said valve means to said mechanism, a valve mechanism in said conduit means actuatable by the brake setting air in said mechanism for movement to a position closing the portion of said conduit means that is connected with said mechanism, when said valve means is in said closed position, against release of the brake setting air in said brake setting mechanism whereby the brake will remain set independently of the air in said conduit, means that is disposed between said valve means and said source, and means actuatable for movement by air in said conduit means under pressure from said source for moving said valve mechanism from its position closing said portion to an open position releasing said brake setting air for movement therepast, an air conduit communicating with air from said source and with said valve means for conducting air under pressure to said valve means moving said valve means to its said closed position, control means respectively in said conduit means and in said air conduit actuatable for controlling the flow of air from said source to said valve means, an auxiliary source of gas under a pressure higher than that of air from said source, a gas conduit connecting said auxiliary source with said air conduit and with the control means in said air conduit for passing gas from said gas conduit to said air conduit and to said valve means, said valve mechanism being actuatable for movement to an open position under the influence of gas from said auxiliary source of gas at said higher pressure whereby said brake mechanisms will be actuatable under the influence of such gas for applying said brakes.

3. A brake system comprising, in combination; a source of air under pressure, brake means including front and rear brakes on a vehicle and brake mechanisms respectively connected therewith actuatable by air under pressure for setting said brakes and automatically releasable upon release of the air pressure in said mechanisms, conduit means connecting said source with said brake mechanisms for supplying air under pressure to said brake mechanisms for so actuating the latter, valve means in said conduit means actuatable by air under pressure in said conduit means for movement to an open position for passing air in the latter under pressure to said brake mechanisms for actuating the latter to set said brakes and also actuatable by air under pressure from said source for movement to a closed position for closing said conduit means to flow of air past said valve means to said mechanisms, a pair of valve elements in said conduit means actuatable by the brake setting air in said mechanism for movement to positions closing the portion of said conduit means that are connected with said mechanisms, when said valve means is in said closed position, against release of the brake setting air in said brake mechanisms whereby said brakes will remain set independently of the air in said conduit means that is disposed between said valve means and said source, and means actuatable for movement by air under pressure in said conduit means for moving said valve elements from their positions closing said portion to open positions releasing said brake setting air for movement therepast, a conduit communicating with air from said source and with said valve means for conducting air under pressure to said valve means for moving said valve means to its said closed position, control means respectively in said conduit means and in said conduit actuatable for controlling the flow of air from said source to said valve means, said conduit means including a pair of separate pipe lines, one communicating with said rear brakes, and one communicating with said front brakes, and a valve member in said conduit means supported for movement from an open neutral position permitting flow of air in said conduit means to said pair of pipes to closed positions closing one pipe of said pair upon air in the other pipe being released due to excess leakage of air therefrom, said member being actuatable for movement to a position closing said one pipe under the influence of air under pressure in said other pipe.

4. In combination with a pair of connected wheel mounted vehicles, one leading the other, and each having brakes on the wheels thereof and air actuatable brake mechanisms connected with said brakes for actuating them by air under pressure, a source of air under pressure, conduit means connecting said brake mechanisms with said source, foot actuatable means in said conduit means actuatable by the foot of the driver on the leading vehicle of said pair of simultaneously controlling the flow of air from said source to said brake mechanisms, a pair of separate valve means in said conduit means respectively actuatable for movement by air under pressure in said conduit means for admitting air in said conduit means to the brake mechanisms on the wheels of the trailing vehicle of said pair and for holding said air in said mechanisms in brake setting relation therein independently of movement of said foot actuatable means after actuation of the valve means of said pair admitting air to said last mentioned brake mechanisms, and for intermittently admitting air in said conduit means to the brake mechanisms on the wheels of the leading vehicle independently of the mechanisms on said trailing vehicle and in response to intermittent actuation of said foot actuatable means, and means for actuating the valve means in the conduit means leading to the brake mechanisms on said trailing vehicle for so holding said air in said last mentioned mechanisms, and means including air under pressure in said conduit means for restoring the brake mechanisms on said trailing vehicle to actuation under the influence of actuation of said foot actuatable means.

References Cited in the file of this patent

UNITED STATES PATENTS

| | | |
|---|---|---|
| 1,459,099 | Hellmann et al. | June 19, 1923 |
| 2,366,608 | Freeman | Jan. 2, 1945 |
| 2,394,343 | Vorech | Feb. 5, 1946 |
| 2,416,222 | Rodway | Feb. 18, 1947 |
| 2,534,871 | Lichtman | Dec. 19, 1950 |
| 2,544,997 | Keim et al. | Mar. 13, 1951 |
| 2,578,388 | Ambler | Dec. 11, 1951 |
| 2,633,147 | Badami | Mar. 31, 1953 |
| 2,648,346 | Deardorff et al. | Aug. 11, 1953 |
| 2,735,441 | Regna | Feb. 21, 1956 |
| 2,776,734 | Hackett | Jan. 8, 1957 |